United States Patent [19]

Younger

[11] Patent Number: 5,341,497

[45] Date of Patent: Aug. 23, 1994

[54] METHOD AND APPARATUS FOR A COMPUTER SYSTEM TO DETECT PROGRAM FAULTS AND PERMIT RECOVERY FROM SUCH FAULTS

[75] Inventor: Thomas C. Younger, Monona, Wis.

[73] Assignee: Ohmeda Inc., Liberty Corner, N.J.

[21] Appl. No.: 168,767

[22] Filed: Dec. 16, 1993

Related U.S. Application Data

[63] Continuation of Ser. No. 777,858, Oct. 16, 1991.

[51] Int. Cl.⁵ .............................................. G06F 11/00
[52] U.S. Cl. ...................... 395/575; 371/16.3;
371/12; 364/DIG. 1; 364/267.9
[58] Field of Search ............... 371/16.3, 62, 12;
395/575; 364/267.9

[56] References Cited

U.S. PATENT DOCUMENTS

| | | | |
|---|---|---|---|
| 4,586,179 | 4/1986 | Sirazi et al. | 371/12 |
| 4,587,967 | 5/1986 | Chu et al. | 128/204.21 |
| 4,617,637 | 10/1986 | Chu et al. | 364/505 |
| 4,627,060 | 12/1986 | Huang et al. | 371/62 |
| 4,708,831 | 11/1987 | Elswroth et al. | 261/130 |
| 4,763,296 | 8/1988 | Gercekci | 364/900 |
| 4,796,211 | 1/1989 | Yokouchi et al. | 364/569 |
| 4,879,674 | 11/1989 | Yazawa | 364/200 |
| 4,912,708 | 3/1990 | Wendt | 371/16.3 |
| 4,982,404 | 1/1991 | Hartman | 371/62 |
| 5,014,190 | 5/1991 | Johnson | 364/200 |
| 5,054,023 | 10/1991 | Kronberg | 371/16.3 |
| 5,073,853 | 12/1991 | Johnson | 395/575 |

Primary Examiner—Robert W. Beausoliel, Jr.
Assistant Examiner—Phillip F. Vales
Attorney, Agent, or Firm—Roger M. Rathbun; Larry R. Cassett; Kenneth Watov

[57] ABSTRACT

A circuit for monitoring the program flow of a computerized or microprocessed system, includes a comparator for matching a uniquely assigned address for entering a given mode of operation, with an address presented by the system controller for entering the operating mode. If the addresses do not match, in response to the detected illegal mode entry attempt, a reset signal is generated for resetting the controller to reinitiate the programmed flow of operation.

16 Claims, 9 Drawing Sheets

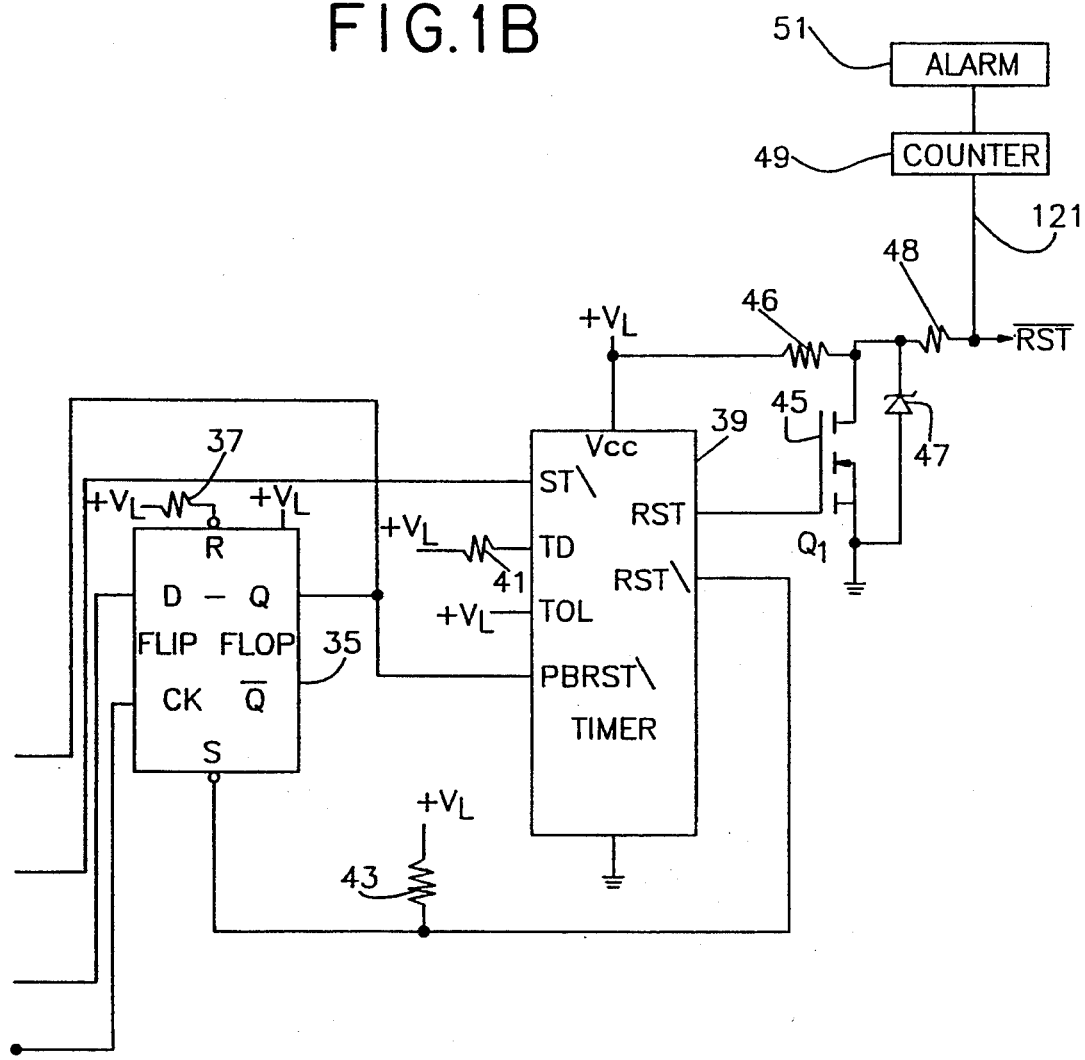

MODE 1 OPERATION

MODE 2 OPERATION

MODE 1
OPERATION
WITH ILLEGAL
SEQUENCE

METHOD AND APPARATUS FOR A COMPUTER SYSTEM TO DETECT PROGRAM FAULTS AND PERMIT RECOVERY FROM SUCH FAULTS

This application is a continuation of application Ser. No. 07/777,858 filed Oct. 16, 1991, now abandoned.

FIELD OF THE INVENTION

The field of the present invention relates generally to methods and apparatus for permitting a computer system to recover from program faults and to detect such faults, and more particularly relates to a "watchdog" system for resetting the main program of a computer system if the program happens to become "hung up" or unable to initiate another cycle of operation.

BACKGROUND OF THE INVENTION

In present computer systems it is known to use hardware timers for resetting operating programs that may have become "hung up" or entered into an endless loop of operation. Such hardware timers are turned on at the initiation of a program cycle, whereby if the computer program does not complete all of the program steps and generate a reset signal for initiating another cycle of operation within a predetermined period of time, the hardware timer will timeout after the predetermined time and itself generate a reset of the computer controller for re-initiating another programmed cycle of operation. In this manner, if the program becomes "hung up", such as by continually repeating one step of the operation or program, for example, the hardware timer will provide a reset signal for permitting the program problem to be overcome. One problem with such hardware timers is that they must completely time themselves out, that is, measure the predetermined period of time before generating a reset signal. As a result, valuable computer time may be lost waiting for the reset signal to occur from a cycle of operation in which the program has gone into a fault condition. In certain applications the time delay may be life threatening, such as in a computer system used to operate a medical ventilator. Another problem with such hardware timers is that the timing period for the timer must be greater than the cycle time for a given program to complete all of the various steps associated with the program.

Other known systems may provide within the operating program itself certain marker information that occurs at selected points in the program cycle. If such a marker does not occur, the operating program detects the absence of the marker and may operate to call for a maintenance program to diagnose the system to determine whether any faults are occurring. This is accomplished in order to prevent premature resetting of the operating program by a watchdog hardware timer. Other known systems for providing a watchdog function are discussed below.

Sirazi et al. U.S. Pat. No. 4,586,179 (hereinafter Sirazi) teaches a microcomputer system that includes a watchdog timer circuit, for resetting the microcomputer in the event that a proper status signal is not applied to the watchdog timer at an appropriate time in a cycle of operation of the microcomputer. Failure of the system to provide the proper status signal is indicative of the microcomputer operating in an error mode such as caused by lockup or some other instability. Circuitry is also provided for detecting when the operating voltage falls below a predetermined level, for resetting the microcomputer at that time. Sirazi provides for automatic resetting and re-initialization of a microprocessor in the system upon the watchdog circuit detecting improper operation of the associated operating program, or upon the detection of excess or reduced operating voltages, as indicated. Until such time that the input power level reaches the proper operating level, the watchdog circuit provides a reset signal to the microprocessor. When the operating system or computer program is operating correctly, a series of timing pulses or a pulse stream are provided to the watchdog circuit. If these timing pulses are interrupted, the watchdog detects the same and resets the microprocessor.

Chu et al. U.S. Pat. No. 4,587,967 (hereinafter Chu) teaches a ventilator or respirator system including a microprocessed controller and a watchdog circuit. Chu monitors voltage levels to insure that a proper voltage is being supplied to the system for operating the ventilating equipment. In column 7, lines 47 through 50, it is indicated that "Reset watchdog step 158 is a safety step for triggering operation of the microprocessor if it has gone into a stop mode."

Chu et al. U.S. Pat. No. 4,617,637 (hereinafter Chu) teaches a respirator system that is similar to the system of Chu et al. U.S. Pat. No. 4,587,967 reviewed above. A watchdog function is discussed in column 8, lines 4 through 26.

Huang et al. U.S. Pat. No. 4,627,060 (hereinafter Wang) is entitled "Watchdog Timer". Specific circuitry and logic are taught in this reference for providing a watchdog timer function. The watchdog circuit includes means for providing a reset signal to a host system until such time that the watchdog system is operating correctly or properly powered up, whereafter the reset signal is terminated and the host system permitted to initiate operation. In column 6, lines 53 through 68, it is indicated that the watchdog timer can be used with either a programmable system of a host, or a hardwired system of a host. Also, the watchdog timer of Huang functions to periodically interrogate the host system, whereby the host system must respond by supplying an appropriate signal back to the watchdog circuit, in order to avoid the watchdog circuit's operating after a specific timed period to send a reset signal back to the host.

Elsworth et al. U.S. Pat. No. 4,708,831 (hereinafter Elsworth) describes a medical related apparatus for humidifying gases. As indicated in column 6, lines 61 through 63, a watchdog circuit 58 is included for checking the system. Note also in column 6 beginning on line 63 the software overview for "backup microprocessor", wherein the program steps are indicated, extending through columns 7 and 8. As shown, a watchdog timeout is included during the initialization process.

Yazawa U.S. Pat. No. 4,879,647 entitled "Watchdog Timer Circuit Suited For Use In Microcomputer", (hereinafter Yazawa) describes and illustrates a watchdog system capable of detecting a computer program "hangup" and/or premature termination of a program sequence. The watchdog circuit monitors computer programmed operation of the system by detecting the level of voltage across a capacitor at given times. When the programming for the system is operating properly, the program periodically executes a predetermined instruction for charging the sensing capacitor to a given voltage level, for maintaining the voltage across the capacitor above a predetermined level at all times that the program is operating correctly. In the event an error or "hangup" occurs in the program sequence, the predetermined instruction or program code will not be executed, whereby the voltage across the sensing capacitor will discharge within a predetermined time to below a predetermined level of voltage, which is sensed by the system for resetting the microprocessor to restart the operating program sequence.

Wendt U.S. Pat. No. 4,912,708 (hereinafter Wendt) teaches the use of a watchdog counter 16 in a digital network for automatically resetting a microcomputer system in the event of some fault occurring. As indicated in column 2, lines 38 through 45, "In order to reset the timer, a predetermined sequence of bytes must be written to the watchdog reset address. If the correct data is not written to the watchdog address, the watchdog timer will eventually timeout and cause a non-maskable interrupt or a system reset, thus allowing the program to recover automatically without manually forcing a reset." The watchdog system taught is a digital system that does not use any analog means for sensing errors in the program routine of the system. The system includes an 8-byte binary counter 12 for generating a sequence of pseudorandom byte patterns for preventing a watchdog counter 16 from timing out to interrupt the microprocessor. A comparator 14 compares the output of counter 12 with a data byte existing on data lines designated D0:D8 (a byte data line). If the two data bytes are identical the comparator acts to reset the watchdog counter 16, but if the bytes are not equal, the watchdog counter 16 is allowed to timeout for resetting the microprocessor.

Hartman U.S. Pat. No. 4,982,404 (hereinafter Hartman) describes a microprocessor system including a watchdog timer for maintaining proper program sequence operation. Hartman teaches a system that includes a main counter, a watchdog timer, and a delay counter. Upon initiation of operation of the microprocessor system, the main counter is periodically decremented as the main program steps through its operating sequence. At a given time in the sequencing, the main timer will begin incrementing the delay timer. During proper operation of the program sequence, the watchdog timer is periodically reset. When the main counter reaches a zero count, the microprocessor is reset for restarting the main program. If the main counter fails to restart the main program, the watchdog timer times itself out, and operates to provide a reset signal to the microprocessor for accomplishing the reset. However, if the watchdog timer fails, the delay counter (which upon completion of the main system program was placed into a stepwise incrementing count) will act to provide a reset of the microprocessor in the event both the main program and the watchdog timer fail to accomplish such a reset. In this manner, the system provides backup subsystems for resetting the microprocessor in the event of errors in the program routine concurrent with a failure of the hardware watchdog timer, preventing it from resetting the microprocessor.

SUMMARY OF THE INVENTION

An object of the invention is to provide an improved method and apparatus for providing a watchdog function in a computer system.

Another object of the invention is to provide a method and apparatus for providing a watchdog function for immediately initiating a reset of a computer system upon the detection of a program fault.

Yet another object of the invention is to provide an improved method of apparatus for providing a watchdog system that is compatible with known hardware watchdog timers.

With these and other objects in mind, and in view of the problems in the prior art, the present invention provides a method and apparatus including means for monitoring each mode of operation of a multimode computerized system. Each program mode of operation of the system is monitored via the monitoring means, whereby the operating system is programmed to transmit a code to the monitoring means that is unique for the particular mode of operation being performed. If the watchdog monitoring means detects that the code is incorrect for the particular program mode of operation, the monitoring means acts to immediately initiate a reset signal for resetting the associated operating system. If a proper code is detected, the monitoring means triggers the associated watchdog circuit to begin measuring a predetermined period of time. If the operating system does not provide the associated watchdog circuit with periodic trigger pulses indicative of proper operation, the watchdog circuit will complete the timing period, and provide a reset pulse to the operating system. Also, regardless of completing a timed out measurement period for issuing a reset pulse, the watchdog circuit will generate a reset pulse if it detects an illegal program address attempting to turn on the timing function for the watchdog circuit. A counter circuit is included to count the number of reset pulses that are outputted from the watchdog circuit within a given period of time for setting off an alarm if more than a given number of reset pulses occur within a timed sequence. Audio and/or visual alarm system means may be included for alerting a user if the operating system malfunctions.

BRIEF DESCRIPTION OF THE DRAWINGS

Various embodiments of the present invention are described and illustrated herein with reference to the drawings in which like items are indicated by the same reference designation, wherein.

DETAILED DESCRIPTION OF THE INVENTION

The present invention was developed for use in a medical ventilator system for providing an improved watchdog circuit function. In view of the use of medical ventilators for assisting a patient in breathing, it is important that such ventilators be prevented from entering into a fault mode of operation for even a relatively short period of time. Accordingly, as indicated above, one objective of the present invention is to provide an improved watchdog circuit for avoiding the time delay required for a hardware type watchdog device to time itself out before resetting a system that entered into a fault mode or endless loop of operation. The embodiments of the invention as described in detail below provide a substantial improvement in the watchdog systems for computerized equipment, such as medical ventilators, for resetting the operating system of the ventilator or some other device under computerized control due to a hangup in the program sequence of operation without waiting for a hardware timer to time itself out.

For purposes of explanation, assume that the present watchdog invention is used for monitoring the operating program sequence of a microprocessor, such as an 80C31 single-chip 8-bit microcomputer (manufactured by Intel Corporation, Santa Clara, Calif.), for example. Such microprocessors may be used in medical ventilators and other similar devices. However, the present invention is not limited to use with any one microprocessor or controller, and can be used for providing a watchdog function for many different computerized systems, whether driven by microprocessors or mainframe computers.

Figure 1A:
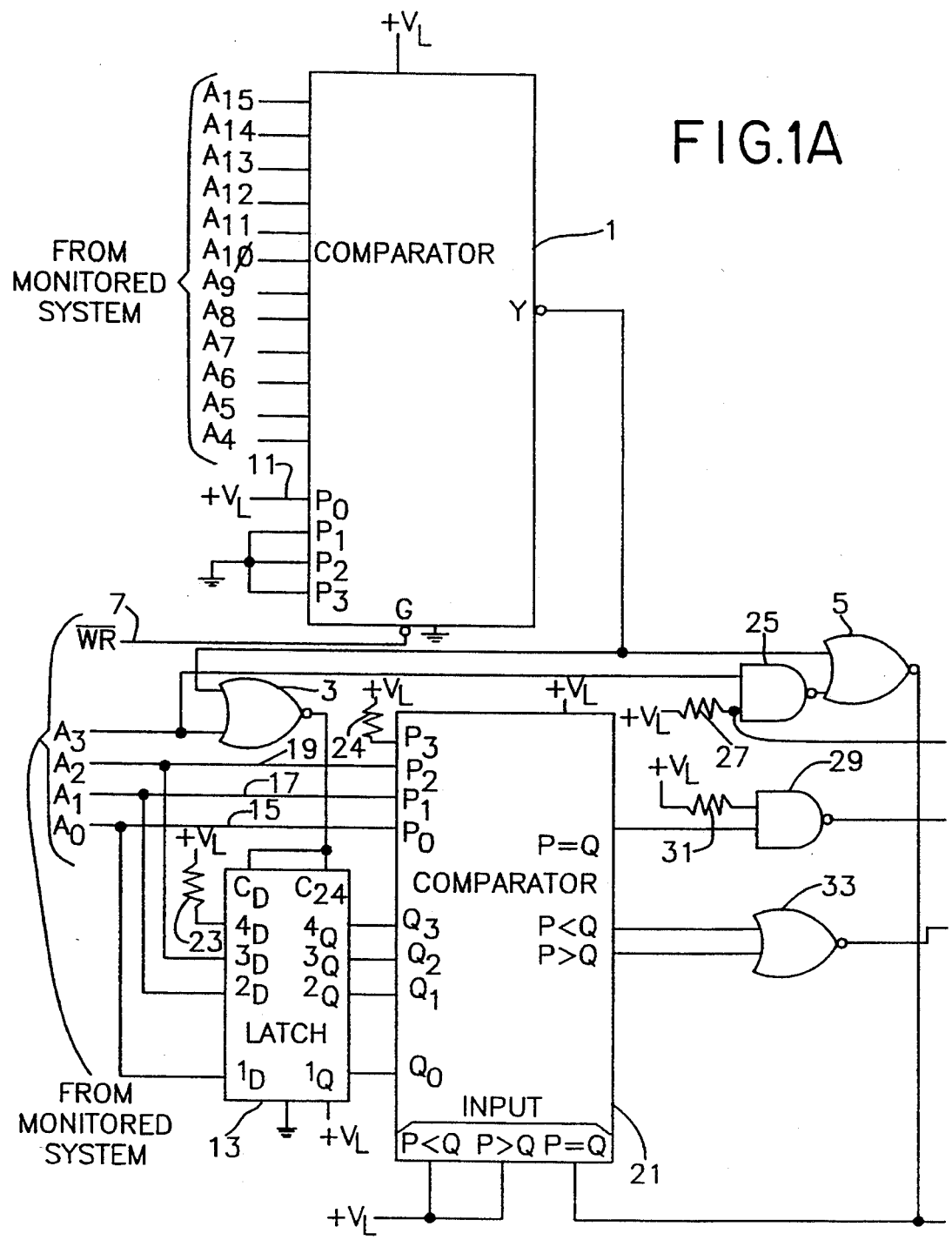
FIG. 1 is a circuit schematic diagram of one embodiment of the invention.

In the embodiment of FIG. 1, a comparator 1 is connected to receive a plurality of hexadecimal address signals $A_4$ through $A_{15}$, in this example, from a microprocessor or controller (not shown) of the system being monitored, for decoding the addresses and providing an output signal to an input terminal of each one of two NOR gates 3 and 5. In this example, the comparator 1 is a 74HC679 12-bit address comparator (manufactured by Texas Instruments, Dallas, Tex.). A not write ($\overline{WR}$) signal line 7 is connected to the G terminal of comparator 1. Comparator 1 also has its $P_0$ terminal connected to a positive logic voltage line 11, and it $P_1$, $P_2$, and $P_3$ terminals connected in common to a source of reference potential, ground in this example. A positive voltage $+V_L$ is also connected to comparator 1.

An address line $A_3$ from the microprocessor is connected to another input terminal of NOR gate 3. A latch 13, in this example provided by a 74HC77 4-bit bistable latch (manufactured by Texas Instruments, Dallas, Tex.), is connected to receive the output signal from NOR gate 3, and is also connected to receive address signals $A_0$, $A_1$, and $A_2$, from address lines 15, 17, and 19, respectively. The positive voltage $+V_L$ is also connected to latch 13 via a coupling resistor 23 to a terminal 4D, with $+V_1$ also being applied directly to a power terminal of latch 13. The latch is electrically terminated to ground.

A comparator 21, in this example a 74HC85 4-bit magnitude comparator (manufactured by Motorola Inc., Phoenix, Ariz.) has its $Q_0$, $Q_1$, $Q_2$, and $Q_3$ input terminals connected to the 1Q, 2Q, 3Q, and 4Q output terminals of latch 13. Comparator 21 also has its $P_0$, $P_1$, and $P_2$ input terminals connected to address lines 15, 17, and 19, respectively. The $P_3$ input terminal of comparator 21 is connected through a coupling resistor 24 to $+V_L$. This voltage is also directly connected to a voltage terminal of comparator 21. The logic supply voltage $+V_L$ is also connected in common to the $P<Q$ and $P>Q$ input terminals of comparator 21. A NAND gate 25 has one input terminal coupled via a resistor 27 to logic voltage $+V_L$, and another input terminal connected in common with the input terminal of NOR gate 3 for receiving address signal $A_3$. The output terminal of NAND gate 25 being connected directly to an input terminal of NOR gate 5.

A $P=Q$ output terminal of comparator 21 is connected to an input terminal of a NAND gate 29, the other input terminal of the latter being connected through a resistor 31 to logic voltage $+V_L$. Comparator 21 also has output terminals $P<Q$ and $P>Q$ connected directly to individual input terminals of a NOR gate 33. A flip-flop 35, in this example a 74HC74 dual D flip-flop with set and reset (manufactured by Motorola), has its $C_K$ input terminal connected in common to the output terminal of NOR gate 5, and the $P=Q$ input terminal of comparator 21, its D input terminal connected to the output terminal of NOR gate 33, its R or reset terminal connected through a coupling resistor 37 to logic voltage $+V_L$, and its power terminal connected directly to $+V_L$.

A micromonitor chip 39, in this example a DS1232 (manufactured by Dallas Semiconductor, Dallas, Tex.) has its PBRST\ input terminal connected in common to the Q output terminal of flip-flop 35, and the input terminal of NAND gate 25 receiving $V_L$. Micromonitor 39 also has its TOL terminal directly connected to $+V_L$, its TD terminal connected via resistor 41 to $+V_L$, its ST\ input terminal connected directly to the output terminal of NAND gate 29, its $V_{cc}$ voltage terminal connected directly to $+V_L$, and its common terminal connected to ground. Micromonitor 39 also has its RST\ terminal connected in common to the S terminal of flip-flop 35, and through a coupling resistor 43 to $+V_L$.

A N-channel MOS transistor 45 is connected with its gate to the RST terminal of micromonitor 39, its source electrode to ground, and its drain electrode connected via a coupling resistor 48 to a counter 49, and resistor 46 to a voltage $+V_L$. A protection Zener diode 47 is connected across the drain and source electrodes of transistor 45. The output of counter 49 is connected to an alarm circuit 51.

The operation of the embodiment of FIG. 1 will now be described. Each mode of the system being monitored, as defined in the software or programming for that system, is assigned a unique watchdog toggle address which is loaded into the present watchdog circuit at the legal program entry point for that mode. The watchdog is toggled by writing to that address (the data lines are ignored) during any program paths in the system being monitored which occur only in the selected mode of operation. An error is detected whenever the program flow is disrupted, such as may occur due to external or internal events, and an illegal sequence or mode of operation is entered into and attempts are made to toggle the watchdog with an illegal address. Each programming mode, in the preferred embodiment, is assigned multiple access to the watchdog address for improving detection of any incorrect program flow. Program entry points are rigorously verified by the software for insuring they were entered legally, and only one legal entry point should be assigned to each mode of program operation.

In this example, the system being monitored is a medical ventilator, as previously mentioned. The ventilator system is controlled by a microprocessor, such as an 80C31 CHMOS single-chip 8-bit microcomputer (manufactured by Intel Corporation, Santa Clara, Calif.), for example. The microprocessor is not shown in the figures, but it is assumed that the addresses being monitored are obtained from this microprocessor or a similar controller of a system being monitored, in this example. Assume for purposes of illustration that watchdog addresses are mapped into external data memory address space, which is not shown in the figures, and that only a write operation (data bus contents ignored) to those addresses will toggle the watchdog. Assume further that initialization addresses are established of [FFE0(base)+offset], toggle addresses of [FFE8(base)+offset]; with an offset range of 0 to 7. In this example the offset address must be the same for both the watchdog initialization and toggle, whereby a difference is detected as an errant program execution and causes the system being monitored to be reset.

The program sequence for obtaining correct operation in the preferred embodiment will now be discussed. At the legal entry point for a given mode of ventilator operation, or operation of the system being monitored, verification must be made that this point in the program has been entered legally. Next, the watchdog circuit must be initialized with the correct offset address for the selected mode of operation. This is followed by writing to the watchdog toggle address (FFE8H+programmed offset) at all points in the program path which are unique to the selected mode of operation. The contents of the data bus of the controller (not shown) are ignored. A legal watchdog toggle must occur at least once every 400 milliseconds to prevent a timeout and subsequent system reset, in this example. All of these operations are carried out via the embodiment of the invention of FIG. 1, which will be described in even greater detail below.

With further reference to FIG. 1, the comparator 1 is a 12-byte comparator that functions to partially decode the base addresses $A_4$ through $A_{15}$ from the microprocessor of the ventilator system being monitored, in this example, for the watchdog initialization and toggle functions. The voltage connection to input terminal $P_0$ via line 11, and the ground connections to input terminals $P_1$, $P_2$, and $P_3$, respectively, determine the logic levels of the state addresses $A_4$ through $A_{15}$ required for causing an active low (decoded) output signal at output terminal Y. With $P_0$ at logic 1, and $P_1$ through $P_3$ at logic 0, the output signal at terminal Y will be at logic 0 whenever address line $A_4$ is at logic 0, lines $A_5$ through $A_{15}$ are at logic 1, and the write line $\overline{WR}$ is at logic 0. In this example, such a result occurs when the microprocessor being monitored has written to a decode address of FFEXH, the H designating hexadecimal coding, and the X indicating "don't care". Note that in this example the pulse width of the decoded Y output signal is 400 nanoseconds minimum.

In this example, if the $A_3$ associated address line is at logic 0 when the write address FFEXH is decoded by comparator 1, a positive pulse or logic 1 will be present at the output terminal of NOR gate 3, thereby enabling latch 13 to store the current states of address lines $A_0$ to $A_2$. The information or data so latched into latch 13 is the watchdog offset address.

If address line $A_3$ is at logic 1 when the address FFEXH is decoded by comparator 1, a positive pulse or logic 1 will be present at the output terminal of NOR gate 5. This pulse enables the P=Q function of comparator 21, by forcing the P=Q input terminal positive, and also causes the flip-flop 35 to sample the state of the signals at the P<Q and the P>Q output terminals of comparator 21 at the D input terminal of the flip-flop 35.

With the P=Q function of comparator 21 so enabled, the P=Q output terminal will be driven high to a logic 1, if the address lines $A_0$, $A_1$, and $A_2$ at comparator 21 are all at the same logic levels as the contents of the latch 13 applied to the $Q_0$, $Q_1$, and $Q_2$ input terminals of comparator 21. During such an occurrence, the resulting positive pulse at the P=Q output terminal of comparator 21 causes a negative pulse to be applied via NAND gate 29 to the ST/ input terminal of micromonitor or watchdog timer 39, causing the latter to be re-initialized. If the "P" and the "Q" inputs of comparator 21 are not equal when the watchdog toggle address is decoded, either the P<Q or the P>Q output terminals will have a high level or logic "1" output signal, for indicating a toggle address error. The rising edge of the positive pulse at NOR gate 5 clocks the error signal at the output terminal of NOR gate 33 into the error latch 35, causing the Q output terminal of latch 35 to go low, in turn forcing the PBRST\ input terminal low, thereby causing a system reset. Upon the occurrence of such a reset, the RST terminal of timer 39 will go high for turning on transistor 45, to provide a reset signal to the system being monitored. After the watchdog timer 39 has timed out for a given measuring period, latch 35 will be preset to a non-error condition. Note that upon the transmission of each system reset pulse, the counter 49 is advanced one count. If the counter is advanced to a predetermined count within a predetermined period of time, it will cause an alarm 51 to be turned on for either visually and/or audibly providing an alarm indication that the system being monitored has entered into a fault mode of operation.

A legal watchdog toggle pulse, in this example, must occur regularly at time intervals of at least 400 milliseconds at the ST\ input terminal of watchdog time 39, in order to prevent a timeout of watchdog timer 39 and a subsequent system reset. If the toggle pulse does not occur within the predetermined periods of time, that is it does not occur often enough, or if an illegal toggle address is detected, watchdog timer 39 will generate a 250 millisecond minimum positive reset pulse at its RST output terminal, and a similar negative reset pulse at its $\overline{RST}$ output terminal, for causing transistor 45 to turn on, causing a reset signal to be applied to the system being monitored. In this example, the microprocessor or controller for a ventilator system being monitored will be reset. If counter 49 detects a given number of resets within a predetermined period of time, counter 49 will be enabled to activate an alarm 51 for indicating that the system being monitored has entered into a fault mode of operation.

Watchdog timer 39 also monitors the power supply voltage level $+V_L$ at its TOL input terminal, and forces a system reset by turning on transistor 45, if a low voltage condition is detected ($+V_L$ reduces below a predetermined level). In this example, the voltage trip point is set at 4.5 volts DC maximum. Note that on power-up or the initial application of power to the watchdog circuit of FIG. 1, the system reset outputs RST and $\overline{RST}$ are kept active for a minimum 250 milliseconds after the power supply trip voltage has been reached.

As previously mentioned, the present invention for a watchdog circuit or network provides for monitoring different modes of operation of the system being monitored. For example, in FIG. 2 a first mode of operation labeled "Mode 1 Operation" begins with step 53 for loading the Mode 1 toggle address into the watchdog circuit via the address bus of the microprocessor or controller being monitored by the watchdog circuit. If the toggle address is a correct address for the desired mode of operation, the main program then proceeds to step through the various sequences "A", "B", "C", "D", and "E". The "X" designations shown in the sequence diagram of FIG. 1 each represent a toggle point within a given sequence that is unique to a given operating mode. In this example, an "X1" indicates a toggle address for a Mode 1 sequence of operation, and an "X2" a toggle address for a Mode 2 sequence of operation. The present watchdog circuit monitors these sequence toggle addresses to insure a legal sequence is being pursued.

Figure 2:
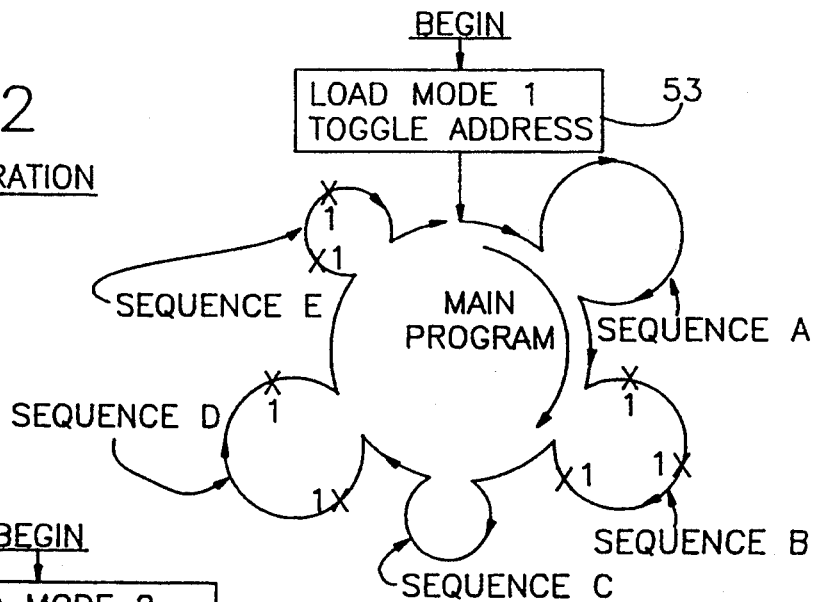
FIG. 2 is a sequence diagram of a first mode of operation of the invention for one embodiment.
Figure 10:
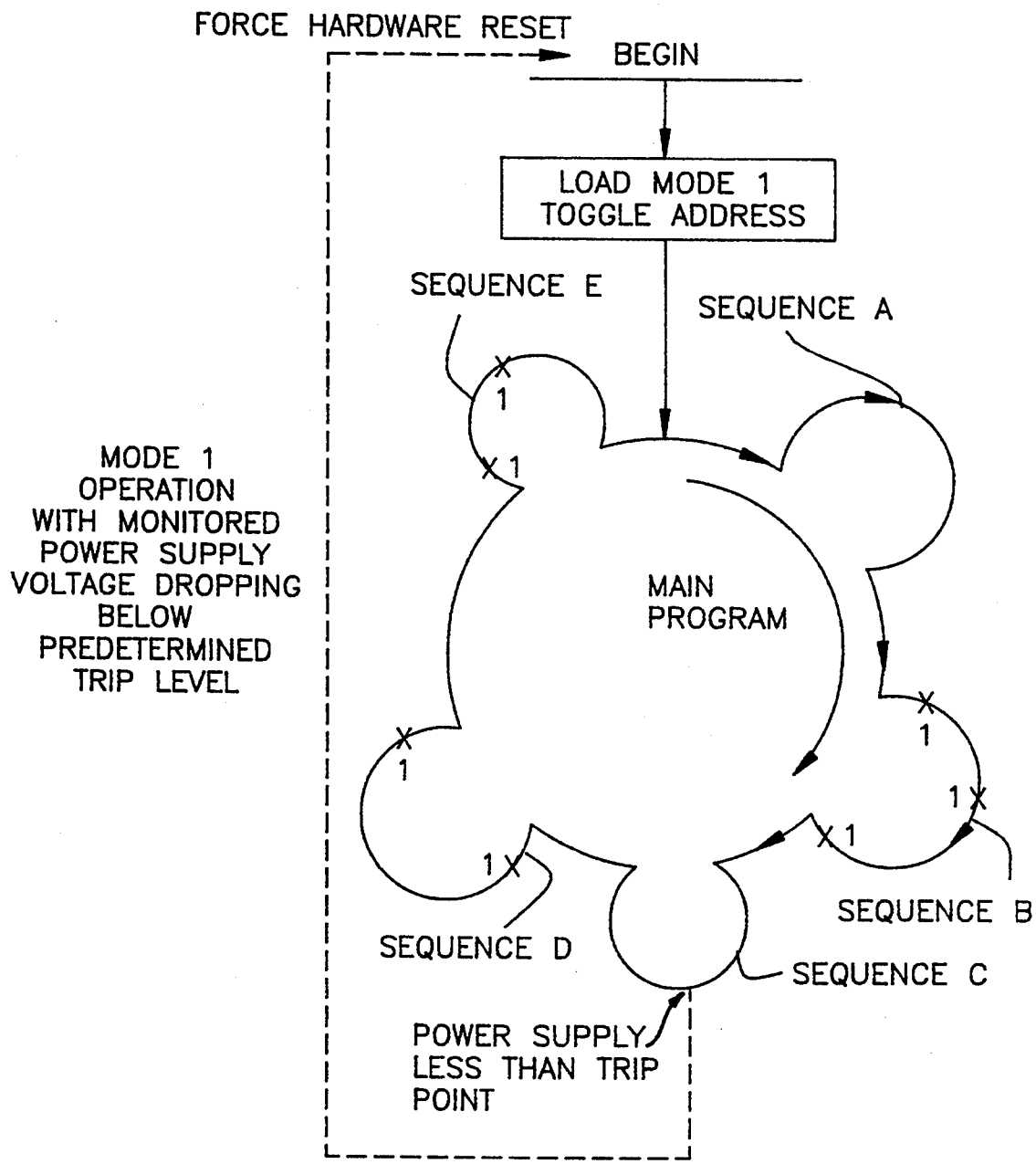
FIG. 10 is a diagram of sequences of operation for the first mode of operation of the invention in which the power supply voltage falls below a predetermined level and forces a hardware reset.

In FIG. 10, another embodiment of the invention is shown relative to the "Mode 1 Operation", at a time when the power supply voltage has decreased below a predetermined trip level. The present watchdog circuit is responsive to such a drop in the monitored power supply voltage to below the predetermined level during "Sequence C", for forcing a hardware reset of the system being monitored, as shown. Note that the only difference between the Mode 1 Operation shown in FIG. 10, and Mode 1 Operation shown in FIG. 2, is that in Sequence C of FIG. 10 the monitored power supply voltage drops to below the predetermined trip level of DC voltage, as shown.

Figure 3:
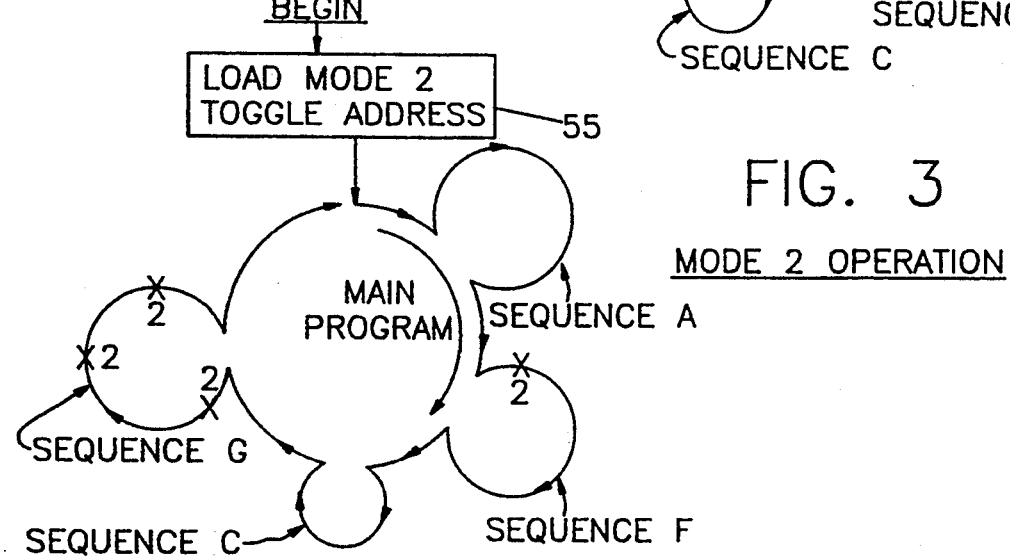
FIG. 3 is a sequence diagram of a second mode of operation for an embodiment of the invention.

Another example of a mode of operation is shown in FIG. 3 for "Mode 2 Operation". As shown, this mode of operation begins with step 55 for loading the Mode 2 toggle address into the watchdog circuits establishing the address which will be monitored by the watchdog circuit. Assuming the toggle address is correct, the main program begins the various sequences of operation, such as sequences "A", "F", "C", and "G", in that order in this example. In the sequence diagrams shown in FIGS. 2 and 3, no illegal sequences were entered, and therefore no hardware resets were initiated by the present watchdog circuit.

Figure 4:
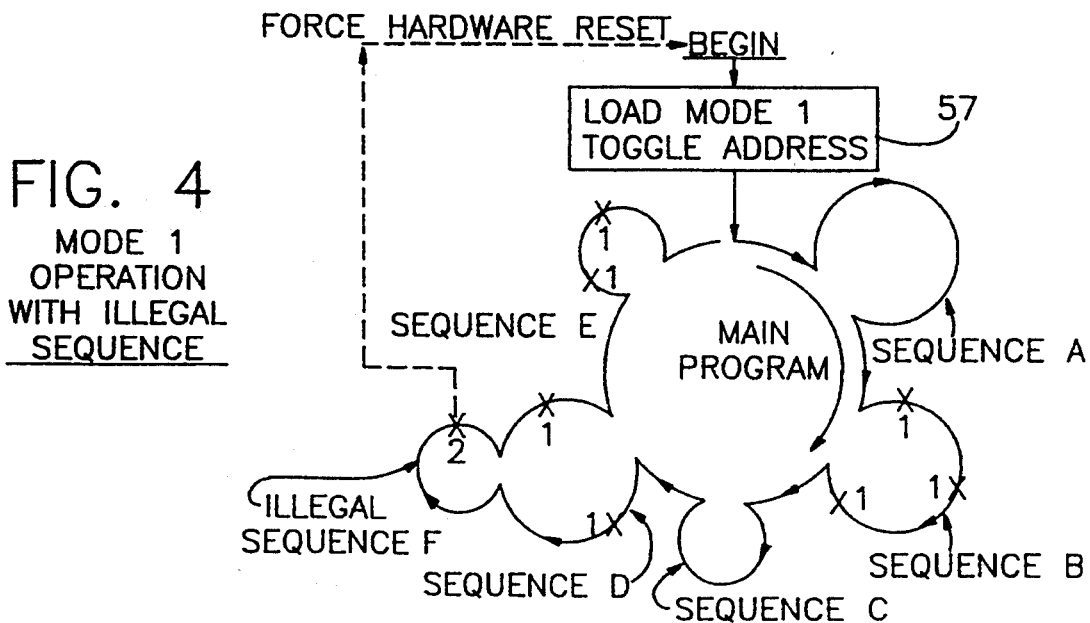
FIG. 4 is a diagram of sequences of operation for the first mode of operation of the invention in which an illegal sequence is entered forcing a hardware reset.

In FIG. 4, the "Mode 1 Operation" is shown including an "Illegal Sequence F". The present watchdog circuit is responsive to the toggle point "2" in "Sequence F", forcing a hardware reset of the system being monitored.

In the above-described embodiments of the invention, and the following embodiments, in comparison to known hardware watchdog timer techniques, the present invention is not time dependent, but is strictly dependent on program flow. The present invention immediately detects an illegal deviation in program execution, and does not require a hardware timeout before forcing a reset and/or error processing, as previously mentioned. Also, the address toggling can be easily added to system software changes and updates. Contrary to this, a typical hardware watchdog timer may have to be modified to accommodate software changes depending on the extent of the changes and the impact on software execution times. Once the present invention is implemented or installed in a given system, the watchdog functions provided can be made as robust as desired without hardware modifications. This provides software only control at this point, resulting in the capability to generate a substantially greater combination of reset patterns with no hardware synchronization overhead, in comparison to prior systems, and additionally allows address toggle points to be placed in as many points in the program code as desired. Typically hardware watchdog timers depend upon any illegal program deviation not returning to a point where the timer is reset before timing out, whereas the present watchdog circuit functions to immediately detect illegal program deviations, and force a reset or error processing via a high priority interrupt.

In comparison to software watchdog techniques known in the art, the present watchdog circuit provides instantaneous recovery to illegal program flow sequences without any software flow checking. This is important in operating modes where illegal program flow could cause a hazardous condition, such as in a medical ventilator system. Implementation of the present watchdog circuit has minimal impact on existing coding, in that it does not require a subroutine call or in-line processing for error checking and correction. Since the present watchdog circuit does not have to rely on software analysis, it can force a hardware initialization. As a result, the problems in typical software watchdog techniques resulting from corruption of a software watchdog analysis routine are avoided. Also, since the present watchdog circuit invention requires only insertion of appropriate toggle address in the operating software, software development in the software watchdog processing code that may be required with software changes is avoided.

The present watchdog circuit invention in its various embodiments can be employed by itself to provide a watchdog function in a particular system. However, to maximize the detection and correction of errors in software execution, certain applications may benefit from employing known hardware and software watchdog techniques, and the watchdog circuit embodiments of the present invention.

Figure 5:
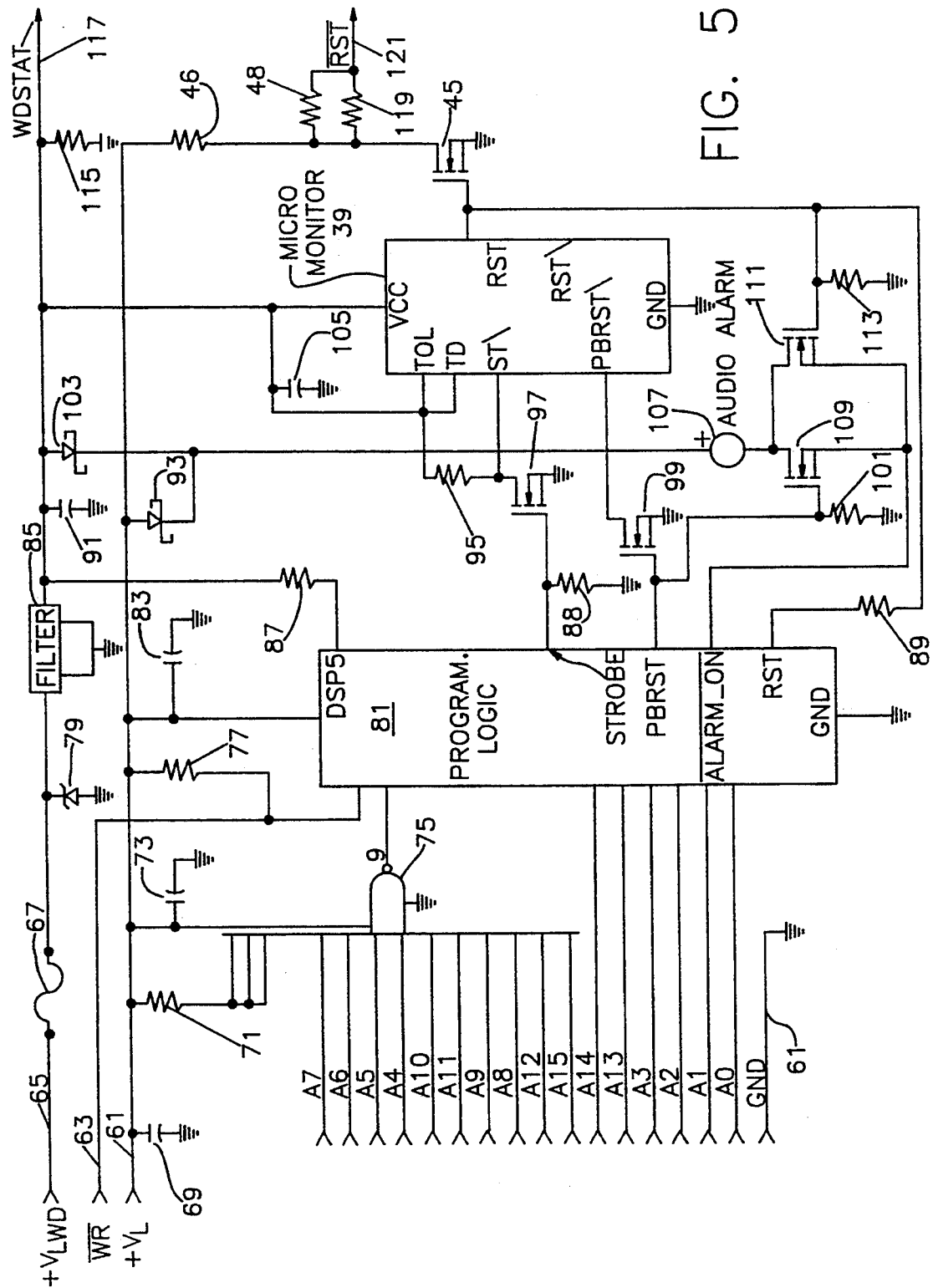
FIG. 5 is a block circuit schematic diagram of another embodiment of the invention.

In a preferred embodiment of the invention, an electrically programmable logic device 81, as shown in FIG. 5, in combination with a multiple input NAND gate array 75, is used to provide relative to the embodiment of FIG. 1, the functions of comparator 1, comparator 21, NOR gates 3, 5, and 33, NAND gates 25 and 29, latch 13, and flip-flop 35.

With further reference to FIG. 5, voltage line 65 provides a power supply logic voltage $+V_{LWD}$, which is coupled through a fuse 67 to the common connection between the cathode of a Zener diode 79 and input of an electromagnetic interference filter 85. The anode of Zener diode 79 is connected to a source of reference potential, ground in this example. Zener diode 79 protects against the voltage $+V_{LWD}$ exceeding +7.0 volts DC, in this example. Also, the EMI filter 85 can be a PI-circuit. The voltage output from filter 85 is connected via voltage bus 117 to a high-frequency bypass capacitor 91, to the anode of a Schottky diode 103, to one end of a resistor 115 having its other end connected to ground (for developing a voltage signal WDSTAT for permitting the status of the voltage on voltage bus 117 to be monitored), to the voltage terminal VCC, to programming pin TOL, and to programming pin TD for micromonitor or timer 39. Also, a bypass capacitor 105 is connected from voltage terminal VCC of timer 39 to ground. A coupling resistor 87 is connected between voltage bus 117 and the DSP5 terminal of programmable logic integrated circuit 81 (in this example a P5C060-45 programmable logic chip, manufactured by Intel Corp., Santa Clara, Calif.). Line 63 connects the $\overline{WR}$ microprocessor write control line (active low) of the ventilator system being monitored, in this example, to the programmable logic chip 81. The line 63 is also connected through pull-up resistor 77 to voltage line or bus 61 for supplying the voltage $+V_L$. A high frequency bypass capacitor 69 is connected between voltage bus 61 and ground. A pull-up resistor 71 is connected between voltage bus 61 and unused input terminals of NAND gate 75. Voltage bus 61 is also directly connected to NAND gate 75, and through another bypass capacitor 73 to ground. A power terminal of the programmable logic 81 is connected to voltage bus 61, and to one end of a high frequency bypass capacitor 83, the other end of which is connected to ground. Another Schottky diode 93 is connected with its anode to voltage bus 61, and its cathode to the cathode of Schottky diode 103 and the positive voltage terminal of an audio transducer 107, for in this example emitting an audible alarm when current is permitted to pass therethrough, as will be described below.

The other end of audio transducer 107 is connected in common to the drain electrodes of N-channel MOS transistors 109 and 111, in this example. The source electrodes of transistors 109 and 111 are connected in common to the programmable logic chip 81. The gate electrode of transistor 109 is connected in common to one end of a resistor 101 having its other end connected to ground, to the gate electrode of another N-channel MOS transistor 99, in this example, and to the programmable logic integrated circuit 81. The gate electrode of N-channel MOS transistor 111 is connected in common to one end of a resistor 113 having its other end connected to ground, to an end of another resistor 89 having another end connected to a programmable logic chip 81, to the gate electrode of another N-channel MOS transistor 45, and to the RST output terminal of micromonitor 39.

Transistor 99 has its source electrode connected to ground, and its drain electrode to the direct reset input (active low) designated as PBRST\ of micromonitor 39. The source electrode of N-channel MOS transistor 45 is connected to ground, and the drain electrode thereof to the common connection of one end of a resistor 48, one end of a resistor 119, and one end of resistor 46. The other end of resistor 48 is connected to the other end of resistor 119, and to an output terminal 121 at which a negative going reset pulse designated $\overline{RST}$ is produced whenever the RST output terminal of micromonitor 39 goes high for turning on transistor 45. The other end of resistor 46 is connected in common to the anode electrode of Schottky diode 93 and other components connected along voltage bus or line 61. The ground or GND ground terminals of the programmable logic chip 81 and micromonitor 39 are connected directly to ground provided by a ground line 61, in this example.

Address lines $A_4$ through $A_{12}$, and $A_{15}$ are connected to individual input terminals of multiple input NAND gate 75. A N-channel MOS transistor 97, in this example, has its gate electrode connected in common to the programmable logic chip 81, and to one end of a resistor 88, the other end of which is connected to ground. Transistor 97 also has its source electrode connected to ground, and its drain electrode connected in common to the input terminal ST\ of micromonitor 39 for receiving periodic watchdog pulses, and to one end of resistor 95. The other end of resistor 95 is connected in common to the programming pin TD of micromonitor 39 for selecting the watchdog timeout delay for micromonitor 39 (typically set for 1,200.0 ms [milliseconds] timeout), to the TOL programming pin of micromonitor 39 for selecting the $V_{cc}$ detection level (set to 4.4 VDC typical in this example), and to one end of bypass capacitor 105.

The watchdog circuit of the preferred embodiment of the invention shown in FIG. 5, similar to the previously described embodiment, detects errant program execution through use of an address matching technique. The circuit also provides a watchdog timeout function. Also, as in the first embodiment, each mode of the system operation being monitored (in this example a medical ventilator), as defined in the software for the system, is assigned a unique watchdog toggle address which is loaded into the watchdog circuit at the legal program entry point for that mode. The watchdog circuit is then toggled by writing to that address (the data lines are ignored) during any program paths which occur only in the selected mode of operation. An error will be detected if program flow is disrupted (due to external or internal influences), and an illegal program sequence attempts to toggle the watchdog with its own different address. Each mode of the system being monitored in the preferred embodiment has multiple accesses to its watchdog address for improving detection of incorrect program flow.

It is advantageous to design the system software for rigorously checking program entry points for each operating mode, for insuring that such modes are entered legally. It is important that only one legal entry point be provided for each mode of operation.

In this example, in the actual programming for the ventilator system being monitored, the watchdog memory map is stored in read only memory (ROM), the watchdog addresses are mapped into external data memory address space, and only a microprocessor write operation (data bus contents ignored) to those addresses toggles the watchdog. This is not shown in the figures for purposes of simplification). Various addresses and offsets were chosen. The initialization addresses chosen were 9FF0H (base)+offset, where H designates hexadecimal as would be known by one of skill in the art. Toggle addresses were chosen as 9FF8H (base)+offset. The offset range chosen was 0 to 7. Note that the offset address must be the same for both the watchdog circuit's initialization and toggling, whereby a difference is detected as an errant program execution, thereby causing the circuit to emit a ventilator system reset pulse $\overline{RST}$, in this example. The reset pulse is applied to the microprocessor system of the ventilator system being monitored, in this example.

A particular program sequence must be followed for indicating correct operation of the system being monitored. At the legal entry point for a given mode of system operation, verification must first be made that this point in the program has been entered legally. Also, the watchdog circuit must be initialized with the correct offset address for the selected mode of operation.

The next step in the program sequencing for correct operation is to write to the watchdog toggle address (9FF8H+ programmed offset) at all points in the program path unique to the selected mode of operation, respectively. As previously indicated, the contents of the data bus are ignored. In this example, a legal watchdog toggle must occur at least once every 900.0 milliseconds to prevent a timeout, and subsequent system reset via micromonitor 39 providing the watchdog timer function.

Accordingly, as in the first embodiment of the invention, the preferred embodiment of FIG. 5 detects errant program execution of the system being monitored, and also provides a watchdog timeout function. A negative reset pulse $\overline{RST}$ occurs on signal line 121 if the watchdog timer 39 is not toggled in an appropriate time, or if an incorrect program execution is detected, as previously described. The audio alarm 107 will sound after 30.0 seconds, in this example, if multiple resets have failed to restore the system being monitored (ventilator system in this example) to correct operation, or immediately if a fuse being monitored on the ventilator control board (not shown), in this example, has blown, but +5.0 VDC still remains applied to the ventilator system being monitored.

More specific details of the operation of the circuit of FIG. 5 will now be given. The electrically programmable logic device 81 is programmed to decode the correct watchdog address in conjunction with NAND gate 75, for providing control signals to the micromonitor or timer 39, and properly sequencing energization of the audio transducer 107. In this example, addresses in the range of 9FF0H to 9FFFH are decoded by NAND gate 75 and programmable logic device 81.

In this example, a legal watchdog toggle pulse must occur regularly at the ST input terminal of micromonitor 39 at time intervals of at least 900 milliseconds. Errant program detection is indicated by a 20 millisecond negative pulse being applied to the PBRST/ input terminal of micromonitor 39, as a result of the programmable logic device 81 turning on transistor 99 for that period of time. If a toggle pulse does not occur often enough, or an illegal or errant program address is detected as just described, a 300 millisecond minimum positive reset pulse will be generated at the RST output terminal of micromonitor 39, causing transistor 45 to turn on for that period of time, in turn causing a negative going pulse $\overline{RST}$ of that duration to be applied via output line 121 to terminal 46, for resetting the system being monitored, such as the ventilator system of this example. The reset RST pulses from micromonitor 39 are also applied to the programmable logic device 81, which is programmed to count these pulses for determining the times that the audio alarm transducer 107 is to be enabled via applying a ground signal (ALRM_ON goes to logic 0) to the source electrodes of transistors 109 and 111, and a positive pulse (PBRST goes to logic 1) to the gate electrode of transistor 109. In this example, the audio alarm transducer 107 is energized if 15 consecutive reset pulses RST occur without any toggle pulses being applied to the ST/ input terminal of micromonitor 39 during the period of occurrence of the former. Note that the alarm 107 is not limited to an audio alarm, and could be an alarm light for giving a visual alarm indicator, or both an audio and visual alarm.

The function of N-channel MOS transistors 45, 97, 99, 109, and 111 is collectively to isolate input and output signals associated with micromonitor 39 from other portions of the circuitry of the system being monitored (ventilator system), thereby permitting individual portions of the system circuitry and the present watchdog circuit of FIG. 5 to be powered up independently from one another, in a manner preventing damage thereto, or affecting the operation of the circuitry. Schottky diodes 93 and 103 provide dual source voltages for the audio alarm transducer 107. In this manner, the audio alarm transducer 107 is operative even if only one of the Schottky diodes 93 and 103 has power applied to their respective anode electrodes.

The programmable logic device 81 is programmed to sense if the voltage bus 117 loses power, via connection to bus 117 through coupling resistor 87. If voltage bus 117 does lose power, programmable logic device 81 responds by applying ground (ALRM_ON goes to logic 0) to the source electrodes of transistors 109 and 111, thereby causing the audio alarm transducer 107 to enabled for emitting an audio signal. Note that NAND gate 75 and programmable logic device 81 will continue to operate even if power is lost on voltage bus 117, because of the direct connection of operating voltage to these devices via voltage bus 61 independent of voltage bus 117, as shown. However, in such occurrences, the alarm sequence is changed, whereby audio alarm transducer 107 is turned on continuously by transistor 109, without any pulsing, the first time an errant program sequence is detected.

In another operating condition, if voltage remains on voltage bus 117, but is lost on voltage bus 61, causing the power to be removed from the programmable logic device 81, the micromonitor 39 responds by causing transistor 111 to cyclically be turned on and off for causing the audio alarm 107 to be cyclically turned on and off. In this example, audio alarm transducer 107 is cycled on for 610.0 milliseconds every 1,810.0 milliseconds, until power is removed from micromonitor 39. The return path for current flowing through the audio alarm transducer 107 (2.0 milliamperes is typical) is through an electrostatic discharge ESD protection structure provided in the integrated circuit of programmable logic device 81, which is connected to the source electrode of transistor 111.

The fuse 61 is included for providing circuit protection for micromonitor 39. Diode 79 provides voltage transient protection, and in conjunction with fuse 67 provides even further protection for micromonitor 39, in the event of a reverse power supply connection, for example. As previously described, filter 85 is a PI-circuit providing electromagnetic interference EMI protection.

Micromonitor 39 also functions to monitor the level of the power supply voltage along voltage bus 117, for forcing a system reset pulse $\overline{RST}$ to occur at output terminal 46 if the voltage on voltage bus 117 falls below a predetermined level. In this example, the voltage trip point is set at 4.5 VDC maximum (4.37 VDC is typical), as previously described. Also in this example, on power-up the system reset output terminal RST is kept active for a minimum of 300 milliseconds after the power supply trip voltage has been reached.

Figure 6:
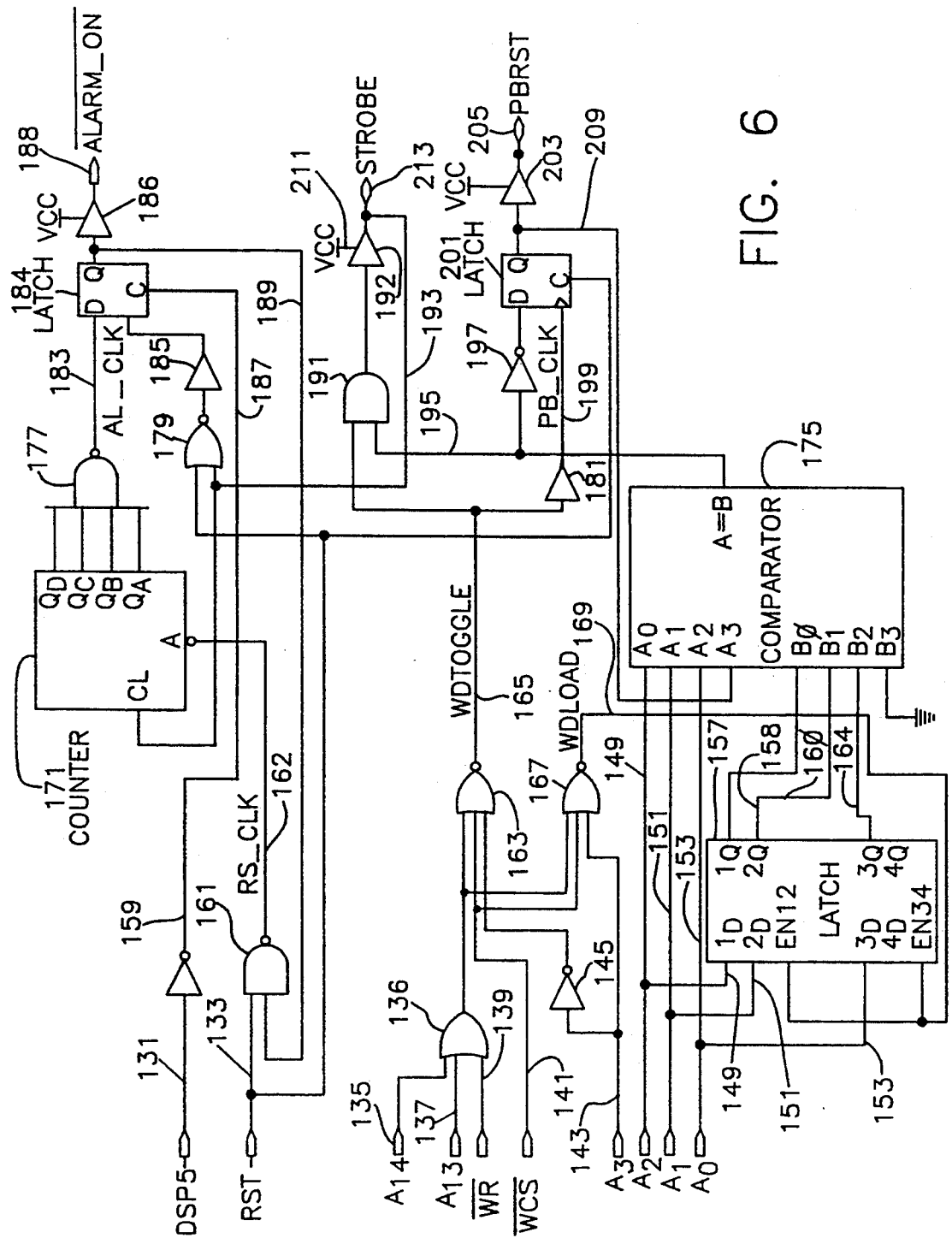
FIG. 6 is a block circuit schematic diagram showing greater details of a portion of the embodiment of the invention of FIG. 5.

With reference to FIG. 6, the internal logic network for the programmable logic device 81 is shown. A description of this logic network will now be given. A DSP5 input signal from coupling resistor 87 (see FIG. 5) is connected via signal line 131 to an input terminal of inverter 159, the output of which is connected to the C clock terminal of latch 184. A reset pulse count or input signal RST input terminal is connected via signal line 133 to one input terminal of a NAND gate 161, to one input terminal of a NOR gate 179, and to a clock terminal C of a latch 201. Address line or signal $A_{14}$ is connected via signal line 135 to one input of OR gate 136. Signal lines 137 and 139 connect address signal $A_{13}$, and $\overline{WR}$ to other individual input terminals of OR gate 136. The output terminal of OR gate 136 is connected in common to one input terminal of NOR gate 163, and one input terminal of NOR gate 167. A $\overline{WCS}$ signal or decoded address lines is connected via signal line 141 in common to individual input terminals of NOR gates 163 and 167, respectively. The $\overline{WCS}$ decoded address signal or line in this example is supplied from the microprocessor of the ventilator system being monitored. An $A_3$ address line is connected via signal line 143 to an individual input terminal of inverter 145, and an individual input terminal of NOR gate 167. Address line $A_2$ is connected via signal line 149 to an $A_0$ input terminal of a comparator 175. The $A_1$ address line from the microprocessor being monitored is connected via signal line 151 to the $A_1$ input terminal of comparator 175, with the latter also having its $A_2$ input terminal connected via signal line 153 to the $A_0$ address line of the microprocessor being monitored. Signal lines 149, 151, and 153 are also connected to the 1D, 2D, and 3D input terminals of latch 157, respectively. The output terminal of NAND gate 161 is connected via signal line 162 for supplying an RS_CLK signal or reset clock signal to an "A" signal terminal of counter 171. The output terminal of NOR gate 163 is connected via signal line 165 for supplying a WD toggle positive going signal pulse (toggle address range of 9FF8H−9FFFH) to individual input terminals of AND gate 191, and inverter 181. The output terminal of NOR gate 167 is connected via signal line 169 for applying a WDLOAD signal (LOAD address range of 9FFOH−9FF7H) to the EN12 and EN34 input terminals of latch 157. The 1Q, 2Q, and 3Q output signal terminals of latch 157 are connected via signal lines 158, 160, and 164, respectively, to the $B_0$, $B_1$, and $B_2$ input terminals of comparator 175, respectively. The $B_3$ input terminal of comparator 175 is connected to a source of reference potential, ground in this example. The clear CL terminal of counter 171 is connected in common to an individual input terminal of NOR gate 179, and to a STROBE output terminal 213 for providing a STROBE signal. The output terminal of buffer gate 181 is connected via signal line 199 to the ">" input terminal of latch 201 for supplying a PB_CLK signal thereto.

The "A=B" output signal terminal of comparator 175 is connected via signal line 195 in common to an individual input terminal of AND gate 191, and an input terminal of inverter 197. The output of NOR gate 179 is connected through a buffer gate 185 to a ">" input terminal of latch 184 for supplying an AL_CLK signal thereto. The output terminal of NAND gate 177 is connected via signal line 183 to the D input terminal of latch 184. The Q output terminal of the latter is connected in common to the input terminal of a buffer gate 186, and via a signal line 189 to an individual input terminal of NAND gate 161. The output of gate 186 is connected to the $\overline{ALRM\_ON}$ output terminal of programmable logic device 81.

The output terminal of AND gate 191 is connected through buffer gate 192 to STROBE output signal terminal 213. The output terminal of inverter 197 is connected to the D input terminal of latch 201. The Q output terminal of latch 201 is connected through buffer gate 203 to the PBRST errant program detection signal terminal 205. This Q output terminal is also connected via signal line 209 to the $A_3$ input terminal of comparator 175.

With further reference to FIGS. 5 and 6, the electrically programmable logic device will be described in greater detail. As indicated, this device 81 is programmed to decode address lines specific to watchdog functions; to store one of eight watchdog toggle addresses (in this example); to compare toggle addresses with latched addresses, for providing appropriate STROBE's or reset signals to an external watchdog timer; and to count consecutive reset pulses from an external watchdog timer for the purpose of alarm management.

OR gate 136, NOR gate 163, inverter 145, and NOR gate 167 are used to decode a write cycle to a 16 byte address range determined by the $\overline{WCS}$ decoded address lines, and the $A_{14}$, $A_{13}$, and $A_3$ address signals. A write access to the first eight bytes generates an enable pulse shown as WDLOAD signal at the output of NOR gate 167, which is used to load latch 157 with the contents of address lines $A_0$, $A_1$, and $A_2$, respectively. A write access to the second eight bytes generates a toggle pulse WDTOGGLE at the output terminal of NOR gate 163, for use in sampling the state of the A=B output terminal of comparator 175 during the write cycle, and controlling the state of the STROBE and PBRST output signals at output terminals 213 and 205, respectively.

After latch 157 is loaded with an $A_0$ to $A_3$ address code, the contents are compared to the levels of the address lines connected to the $A_0$ through $A_3$ input terminals of comparator 175, whenever a WDTOGGLE pulse occurs. If the latched address is the same as the toggle address, then the "A=B" output terminal of comparator 175 will go positive or to a logic 1, and AND gate 191 will be enabled to cause a positive STROBE pulse to appear at output terminal 213. The width of this STROBE pulse will be the same as the shortest pulse occurring from amongst the input signals $A_{14}$, $A_{13}$, $\overline{WR}$, $\overline{WCS}$ and $A_3$ signals. Also at this time, the latch 201 will sample the complemented A=B output signal from comparator 175 at the rising edge of the WDTOGGLE signal. The PBRST output signal from latch 201 will remain at logic 0 as long as the output signal at the A=B output terminal of comparator 175 is at logic 1, when a WDTOGGLE pulse occurs.

If a WDTOGGLE pulse is decoded, but there is no matching of the $A_0$ to $A_3$ addresses in latch 157 to those received by comparator 175, the signal at the A=B output terminal of comparator 175 is at logic 0, thereby forcing the STROBE output signal at output terminal 213 to remain at logic 0 throughout the decoded write cycle. The PBRST output signal at output terminal 205 is also clocked to a logic 1 under these conditions, whereby the positive edge of the WDTOGGLE signal occurs while the "D" input terminal of latch 201 (complemented A=B output of comparator 175) is at a logic 1 state. The PBRST signal fed back to the four byte comparator 175 prevents the latch 201 from being reset until a positive reset signal occurs at the RST input terminal of programmable logic device 81.

Consecutive RST pulses are counted by the four-byte counter 171. A count occurs on the positive edge of each RST input signal. Counter 171 is reset by the STROBE signal that occurs at terminal 213 whenever a matching toggle address is detected. The decoded output signal from counter 171 is sampled at the D input terminal of latch 184 at the time of occurrence of the falling edge of the RST or STROBE input signals applied to NOR gate 179. The output signal developed at the Q output terminal of latch 184 applied through gate 186 for producing the $\overline{ALRM\_ON}$ at terminal 188 changes to a logic 0 state after 15 consecutive RST pulses occur in a time period in which a STROBE signal does not occur at terminal 213. Upon such an occurrence, a STROBE pulse is required to occur at terminal 213 for resetting counter 171, and clocking latch 184, changing the $\overline{\text{ALRM\_ON}}$ output signal at terminal 188 to a logic 1. This output signal is also forced to a logic 0 whenever the DSP5 sense input signal for the power supply voltage $+V_{LWD}$ is at logic 0.

Upon power-up of the watchdog circuit or network, counter 171 is forced to a reset ($\phi$ count) state and the output signals from latch 184 and latch 201 are both at logic 0. The output signal from latch 184, $\overline{\text{ALRM\_ON}}$, is clocked to a logic 1 after the first RST or STROBE pulse occurs.

Figure 7:
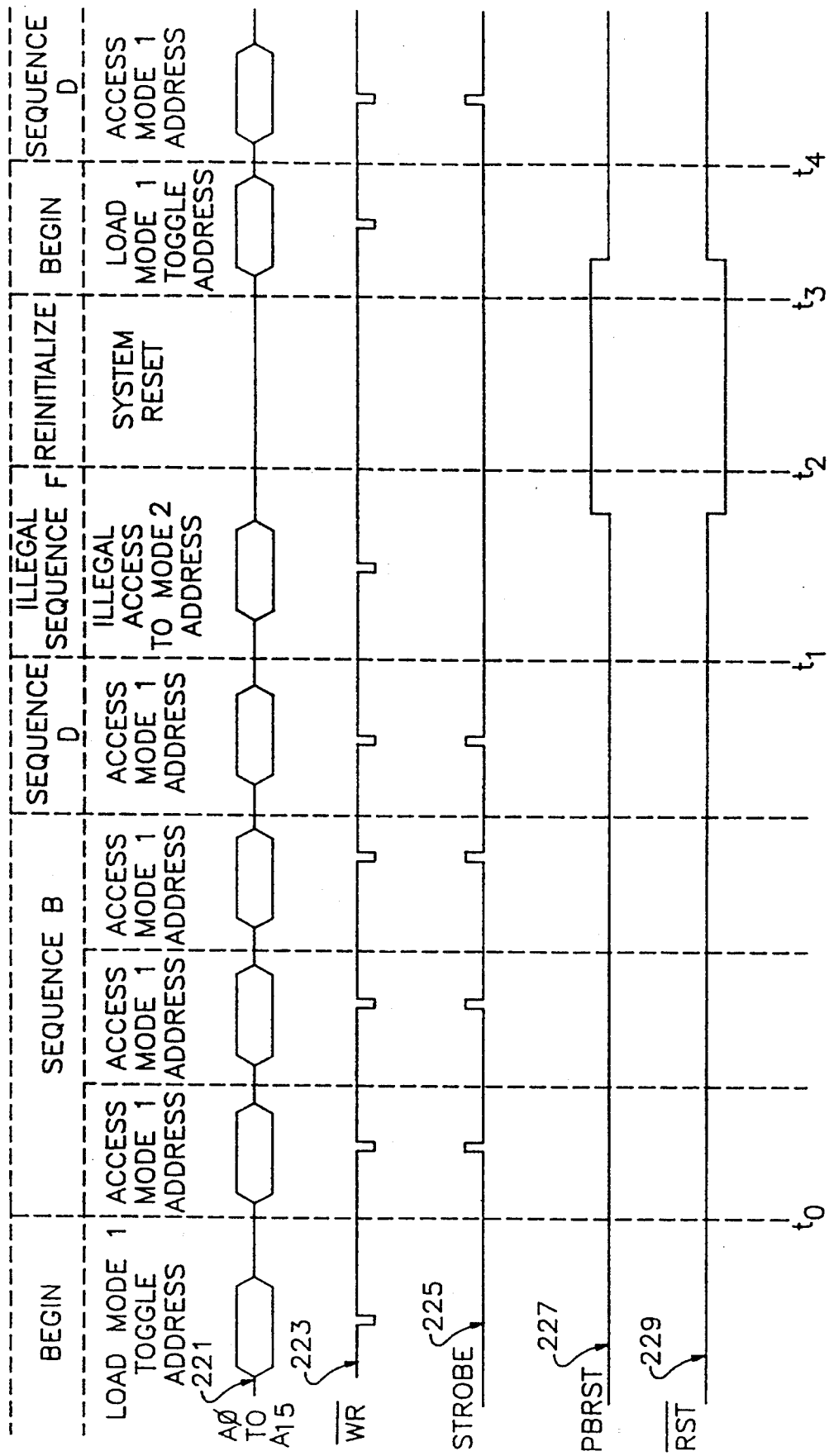
FIGS. 7, 8 and 9 each show timing diagrams for different modes of operation of embodiments of the invention.
Figure 8:
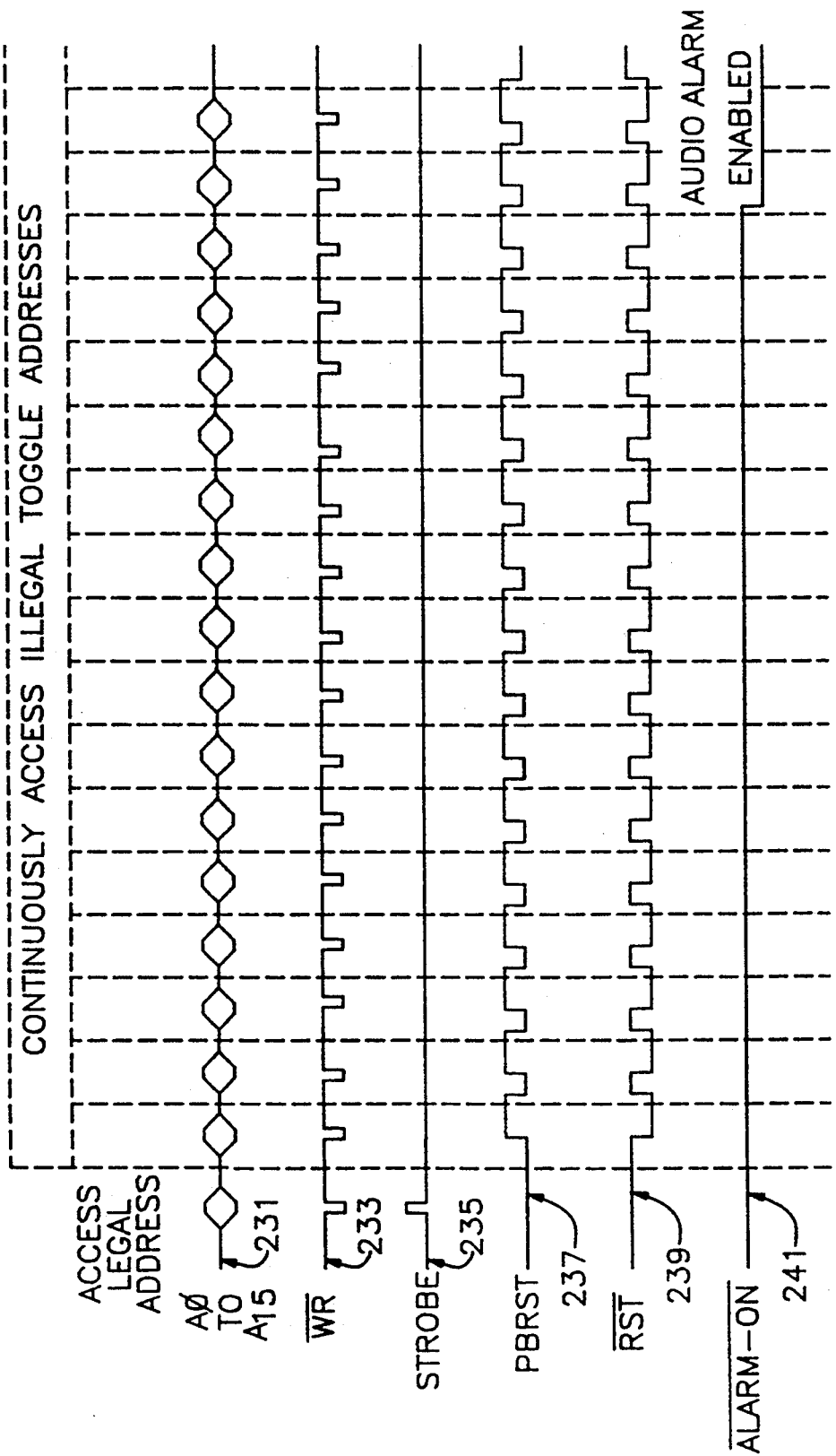
Figure 9:
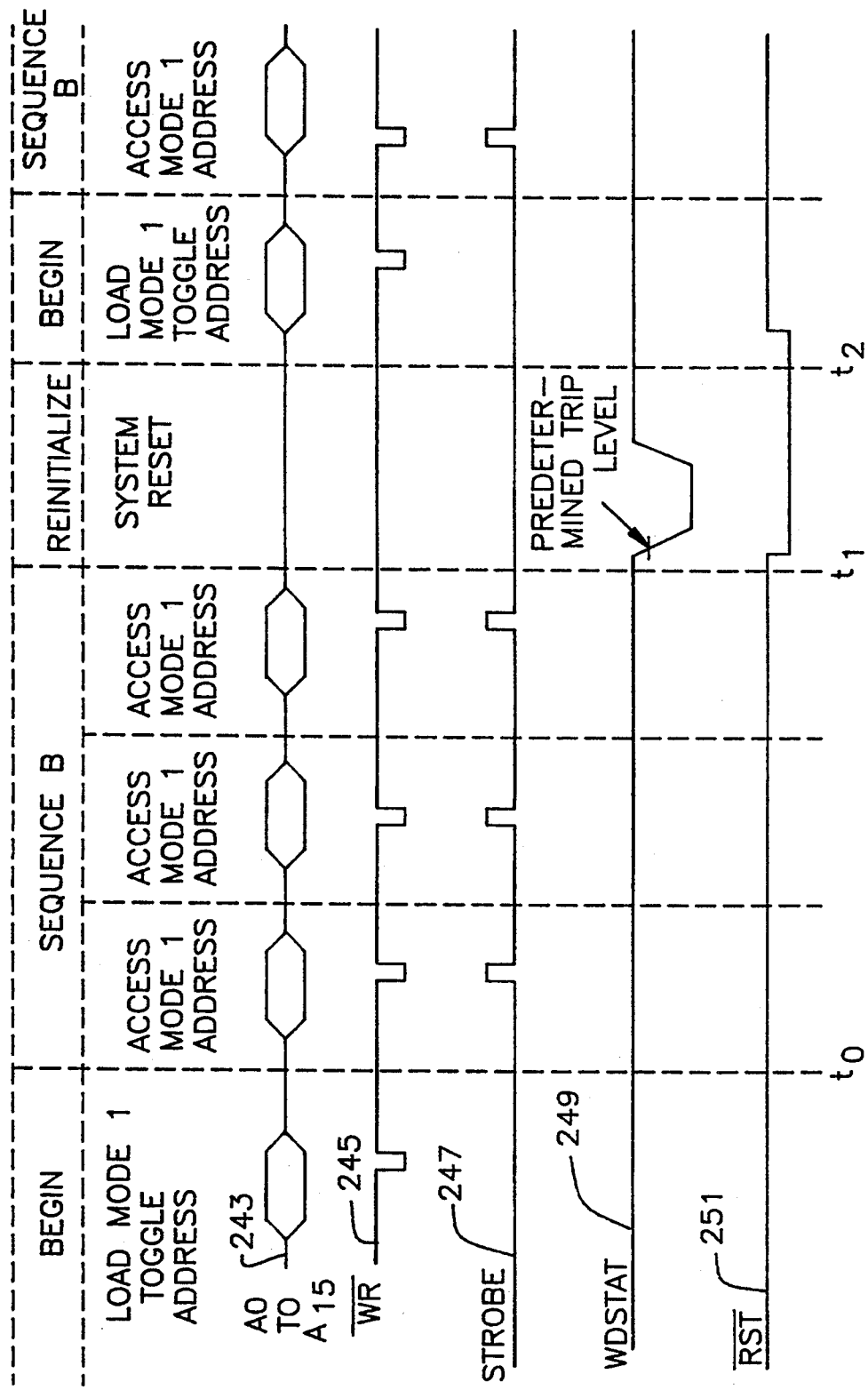

Timing diagrams are shown in FIGS. 7, 8, and 9, for various waveforms that may occur over an illustrated period of operation of the present invention, for the preferred embodiment. In FIG. 7, waveforms for monitoring various sequences of operation of the system being monitored are shown as an example of one possible period of operation. Waveform 221 shows via the hexagonal symbols address signals $A_0$ through $A_{15}$. Waveform 223 shows the occurrence of $\overline{\text{WR}}$ write control pulses from the microprocessor or controller being monitored, and connected to the present watchdog circuit via signal line 63. Waveform 225 shows STROBE pulses developed at terminal 213. Waveform 227 shows PBRST output signals indicating errant program detection (logic 1 is indicative of an error in this example) for programmable logic device 81. Lastly, waveform 229 shows $\overline{\text{RST}}$ reset pulses provided via signal line 121 to the system controller being monitored for resetting the controller to reinitiate a programmed sequence of operations, as previously described.

As illustrated, between times $t_0$ and $t_1$, legal sequences of operation are monitored, and the associated waveforms are shown. At time $t_1$, the system being monitored is shown to enter into an illegal sequence F, that is into an illegal access to Mode 2, for example. As a result, during the illegal sequence F time period between times $t_1$ and $t_2$, no STROBE pulses 225 appear. Also, in response to the detection of an illegal access to a Mode 2 address, the PBRST errant program detection signal goes high or to logic 1, and the reset signal $\overline{\text{RST}}$ goes low or to logic 0, for re-initializing the system being monitored.

Assume that at time $t_3$ the system being monitored has been re-initialized, and that a new cycle of operation is to begin. Between times $t_3$ and $t_4$ toggle addresses are loaded into the present monitoring or watchdog circuit, and beginning after time $t_4$, a Mode 1 address is accessed, and as illustrated in this example, is determined to be a legal address, whereby a STROBE signal pulse is outputted at terminal 213.

In FIG. 8, the timing diagram shows a period of time during which continuously accessed illegal toggle addresses are monitored from the controller or microprocessor of the system to which the present watchdog circuit or network is connected. Waveform 231 shows, via the hexagonal symbols, a valid address on the address bus for address signals $A_0$ through $A_{15}$. The pulse train 233 shows the write control signals $\overline{\text{WR}}$ received on signal line 63 from the microprocessor or controller being monitored. Waveform 235 shows STROBE signals providing a periodic positive watchdog pulse, in this example, at terminal 213. Waveform or pulse train 237 shows the PBRST errant program detection pulses (logic 1 represents an error in this example) from the programmable logic chip 81. Waveform 239 shows $\overline{\text{RST}}$ pulse signals provided on reset line 121, which are at logic 0 in the active state. Lastly, waveform 241 shows the $\overline{\text{ALRM\_ON}}$ audio alarm enable output signal appearing at terminal 188 of programmable logic 81. As shown, from the initiation of operation with a continuously monitored illegal toggle address over each monitoring cycle, after fifteen $\overline{\text{RST}}$ pulses have been counted by counter 171, the audio alarm enable output $\overline{\text{ALRM\_ON}}$ signal goes low or to logic 0, for enabling the alarm 107.

In FIG. 9, the timing diagram shows a period of time beginning shortly after time $t_1$, during which the level of the power supply voltage drops below a predetermined level during a legal sequence of operation, forcing a hardware reset of the system being monitored. Waveform 243 shows, via the hexagonal symbols, a valid address on the address bus for address signals $A_0$ through $A_{15}$. The pulse train 245 shows the write control signals $\overline{\text{WR}}$ received on signal line 63 (see FIG. 5) from the microprocessor or controller being monitored. Waveform 247 shows STROBE pulses at terminal 213 (see FIG. 6). Waveform 249 shows the power supply voltage, WDSTAT, appearing on voltage line 117 (see FIG. 5). Lastly, waveform 251 shows $\overline{\text{RST}}$ reset pulses provided via signal line 121 (see FIG. 5), which are at logic 0 in the active state.

As illustrated, between times $t_0$ and $t_1$, legal sequences of operation are monitored, producing the waveform shown. As previously indicated, shortly after the occurrence of time $t_1$, the level of the power supply voltage WDSTAT of the system being monitored drops below a predetermined trip level as shown in waveform 249, causing the reset signal $\overline{\text{RST}}$ (see FIG. 5) to go low, or to logic 0, reinitializing the system being monitored. After time $t_2$, the system being monitored has been reinitialized, whereafter in this example legal sequences of operation are thereafter monitored, as shown.

Note that the watchdog time micromonitor 39 monitors the voltage level line of WDSTAT on line 117 for the embodiment of the invention of FIG. 5, in substantially the same manner as previously described for the operation of the embodiment of the invention of FIG. 1. In this example, as previously indicated, the micromonitor 39 is a DS1232 device, and the voltage trip points available are predetermined by the manufacturer, Dallas Semiconductor, Dallas, Tex. For example, this device has trip points of 4.5 volts DC, as previously indicated, and also 4.75 volts DC.

Although various embodiments of the invention have been shown and described herein, they are not meant to be limiting. Those of skill in the art may recognize certain modifications to these embodiments, which modifications are meant to be covered by the spirit and scope of the appended claims.

What is claimed is:

1. A circuit for monitoring the programmed flow of operation of a computerized system including a programmable controller for at desired times operating said system in one of a plurality of different programmed modes of operation, respectively, and within each mode of operation, in programmed sequences of operation, relative to a main program, comprising:

assignment means for assigning a unique mode toggle address from a plurality of programmable addresses for each predetermined mode of operation of said system being monitored only at the beginning of the associated mode of operation, which toggle mode address remains assigned to said mode, and to its associated said plurality of programmed sequences, respectively, so long as said mode is active;

matching means controlled only by software for both matching said predetermined mode toggle address preloaded into said monitoring circuit for the computerized system a system reset signal is generated substantially immediately after the error is detected for resetting said controller, if the error was transitory or has been removed, to reinitiate the desired mode of operation.

2. The monitoring circuit of claim 1, further including:

counting means, upon detection of an error by said matching means, responsive to a predetermined number of system reset signals therefrom occurring within a predetermined period of time, for generating an alarm turn-on signal; and alarm means responsive to said alarm turn-on signal for indicating said computerized system has entered into an illegal sequence of operation.

3. The monitoring circuit of claim 1, further including:

a voltage bus for connecting at least a portion of said monitoring circuit to an operating voltage; and voltage sensing means connected to said voltage bus, for generating a system reset signal to reset said controller, whenever the level of said operating voltage falls below a predetermined voltage level.

4. The monitoring circuit of claim 1, wherein said matching means further includes means for matching a predetermined sequence toggle address (preloaded into said monitoring circuit for indicating a legal sequence of operation within a given mode of operation), with an address from said controller for entering the desired sequence of operation, for generating said system reset signal if the sequence toggle address does not match a sequence valid for the associated mode of operation, thereby indicating an illegal sequence.

5. The monitoring circuit of claim 1, further including:

STROBE pulse producing means included in said matching means, for periodically producing a STROBE signal so long as said matching means detects a legal mode address, and/or a legal sequence toggle address, and for terminating said STROBE signals if an illegal address is detected; and timing means responsive to the termination of said STROBE signals for greater than a predetermined period of time, for generating said error system reset signal.

6. A circuit for monitoring the programmed flow of operation of a computerized system including a programmable controller, said controller being programmable for selectively operating said system in one of a plurality of different modes of operation at a given time, and through a plurality of programmed sequences uniquely associated with said modes of operation, respectively, said monitoring circuit comprising:

comparator means controlled only by software for comparing a predetermined toggle address selected from a plurality of programmable addresses loaded into said circuit only at the beginning of and representing both a desired mode of operation, and the desired mode's associated plurality of programmed sequences, respectively, for the period of time the system remains in the desired mode of operation, with an address generated by said controller in attempting to cause said system to enter said desired mode of operation, both for generating a STROBE signal if the addresses match indicating a legal entry into said desired mode of operation, and generating an error signal if the addresses do not match indicating an illegal mode entry, said comparator means also including means for comparing said predetermined address representing said desired mode with addresses generated by said controller at predetermined single or multiple points within selected ones of a plurality of said programmed sequences of said mode, for generating said STROBE signal for address match, and said error signal for address mismatches; and timer means responsive to the occurrence of an error signal in a period of time in which a STROBE signal does not occur, for substantially immediately generating a system reset signal, for resetting said controller to restart a main program of operation.

7. The monitoring circuit of claim 6, wherein said timer means includes means for also generating said system reset signal if STROBE pulses do not occur within a predetermined period of time.

8. The monitoring circuit of claim 6, further including:

a voltage bus for connecting an operating voltage to at least a portion of said monitoring circuit; and said timer means including voltage sensing means responsive to the level of said operating voltage decreasing below a predetermined level for generating said system reset signal.

9. The circuit of claim 6, further including:

counting means responsive, subsequent to the generation of an error signal by said comparator means, to the occurrence of a predetermined number of error system reset pulses over a predetermined period of time, for generating an alarm on signal; and alarm means responsive to said alarm on signal, for turning on to warn system users that said system is in a fault mode of operation.

10. The monitoring circuit of claim 6, wherein said comparator means further includes means for comparing during operation of said system in a given mode of operation, an address predetermined for a given sequence of operation for the given mode with a toggle address from the actual sequence, for generating said system error signal if the addresses do not match, indicating that an illegal sequence for that mode of operation has been entered into.

11. A method for monitoring the programmed flow of operation of a computerized system including a programmable controller, said controller being programmed for selectively operating said system in a desired one of a plurality of different modes of operation at a given time, and through a plurality of programmed sequences uniquely associated with said modes of operation, respectively, said method comprising the steps of:

A) assigning from amongst a plurality of programmable addresses a unique address for each selected mode of operation, and for use within a plurality of said programmed sequences associated with the selected mode of operation, only at the beginning of each mode of operation, which address remains unchanged as long as said system remains in a given mode of operation, and which address must be entered by said controller for accessing the associated mode of operation;

B) matching controller generated access addresses to begin and continue operating in a particular mode of operation with the assigned access address for the desired mode, to determine if the addresses match for a legal access, or do not match indicating an illegal access, and for determining if at single or multiple points within selected ones of said plurality of programmed sequences, respectively, within a given mode of operation the aforesaid addresses match; and C) generating a system reset signal to reset said controller substantially immediately upon the event of determining an illegal access request by said controller for a given mode of operation.

12. The method of claim 11, further including the steps of:

D) counting, subsequent to the indication of an illegal access, the number of system reset signals occurring within a predetermined period of time; and E) turning on an alarm in the event more than a predetermined number of system reset signals are counted within the predetermined period of time.

13. The method of claim 11, further including the steps of:

F) sensing the voltage level of an operating voltage for said system; and

G) generating said system reset signals whenever said operating voltage falls below a given voltage level.

14. The method of claim 11, further including the steps of:

H) assigning a unique toggle address for at least one toggle point within selected ones of said plurality of programmed sequences;

I) reading the toggle address at each toggle point during said system operating in a given mode of operation;

J) comparing each said toggle address to legal toggle addresses for identifying sequences associated with a present mode of operation; and K) generating said system reset signal if an illegal sequence has been entered relative to a present mode of operation.

15. The method of claim 14, further including the steps of:

L) periodically generating a STROBE signal for indicating proper program flow in said controller;

M) turning on a timer at the termination of each STROBE signal;

N) resetting said timer upon the occurrence of each STROBE signal; and

O) generating said system reset signal if a STROBE signal does not occur within a predetermined period of time as measured by said timer.

16. A method for monitoring the programmed flow of operation of a computerized system including a programmable controller, said controller being programmed for selectively operating said system in a desired one of a plurality of different modes of operation at a given time, and through a plurality of programmed sequences uniquely associated with said modes of operation, respectively, said method comprising the steps of:

A) assigning from amongst a plurality of programmable addresses, a unique address for each mode of operation of said system at the beginning of each mode of operation, which address must be entered by said controller for accessing the associated mode of operation;

B) matching a controller generated access address to begin and continue operating in a particular mode of operation with the predetermined access address for the desired mode, to determine if the addresses match for a legal access, or do not match indicating an illegal access;

C) generating a system reset signal to reset said controller in the event of an illegal access request for a given mode of operation;

D) counting subsequent to the indication of an illegal access, the number of system reset signals occurring within a predetermined period of time;

E) turning on an alarm in the event more than a predetermined number of system reset signals are counted within the predetermined period of time;

F) sensing the voltage level of an operating voltage for said system;

G) generating said system reset signal whenever said operating voltage falls below a given voltage level;

H) assigning a unique toggle address for at least one toggle point within a programmed sequence of selected ones of said plurality of different modes of operation;

I) reading the toggle address at each toggle point during said system operating in a given mode of operation;

J) comparing each said toggle address to legal toggle addresses for identifying sequences associated with a present mode of operation;

K) generating said system reset signal if an illegal sequence has been entered relative to a present mode of operation;

L) periodically generating a STROBE signal for indicating proper program flow in said controller;

M) turning on a timer at the termination of each STROBE signal;

N) resetting said timer upon the occurrence of each STROBE signal; and

O) generating said system reset signal if a STROBE signal does not occur within a predetermined period of time as measured by said timer.

* * * * *

UNITED STATES PATENT AND TRADEMARK OFFICE
CERTIFICATE OF CORRECTION

PATENT NO. : 5,341,497
DATED : August 23, 1994
INVENTOR(S) : Thomas C. Younger

It is certified that error appears in the above-indentified patent and that said Letters Patent is hereby corrected as shown below:

Claim 1, Column 19, Line 4, after "system" insert --with an address subsequently written into the system by said controller to enter and retain the system in the desired mode of operation, and with the latter address written into the system by said controller at predetermined single or multiple points within predetermined ones of a plurality of said programmed sequences of operation within said mode, respectively, whereby if the two addresses do not match either upon an attempt to enter the desired mode of operation or at each of said multiple points within said plurality of said programmed sequences of operation of the desired mode, indicative of an error,--.

Signed and Sealed this

Twenty-ninth Day of November, 1994

*Attest:*

BRUCE LEHMAN

*Attesting Officer*     *Commissioner of Patents and Trademarks*